United States Patent
Tang

(10) Patent No.: US 10,784,940 B2
(45) Date of Patent: Sep. 22, 2020

(54) 5G PLATFORM-ORIENTED NODE DISCOVERY METHOD AND SYSTEM, AND ELECTRONIC DEVICE

(71) Applicant: HUIZHOU TCL MOBILE COMMUNICATION CO., LTD., HuiZhou, Guangdong (CN)

(72) Inventor: Yanbo Tang, HuiZhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 0 days.

(21) Appl. No.: 16/465,778

(22) PCT Filed: Nov. 30, 2017

(86) PCT No.: PCT/CN2017/113780
§ 371 (c)(1),
(2) Date: May 31, 2019

(87) PCT Pub. No.: WO2018/099415
PCT Pub. Date: Jun. 7, 2018

(65) Prior Publication Data
US 2019/0319690 A1    Oct. 17, 2019

(30) Foreign Application Priority Data

Dec. 2, 2016 (CN) .......................... 2016 1 1095608

(51) Int. Cl.
*H04B 7/06* (2006.01)
*H04B 17/327* (2015.01)
(Continued)

(52) U.S. Cl.
CPC ......... *H04B 7/0626* (2013.01); *H04B 17/327* (2015.01); *H04B 17/336* (2015.01); *H04L 5/0048* (2013.01); *H04W 24/10* (2013.01)

(58) Field of Classification Search
None
See application file for complete search history.

(56) References Cited

U.S. PATENT DOCUMENTS 9,094,855 B2 * 7/2015 Etemad ................ H04W 24/10
9,172,438 B2 * 10/2015 Koivisto ............... H04B 7/024
(Continued)

FOREIGN PATENT DOCUMENTS

CN    101873629 A    10/2010
CN    104067660 A    9/2014
(Continued)

OTHER PUBLICATIONS

CSI enhancements for hybrid FD-MIMO, project, Apr. 15, 2016, 3GPP TSG RAN WG1 Meeting #84bis, R1-163187, 3GPP, Busan Korea.

(Continued)

Primary Examiner — Berhanu Tadese
(74) Attorney, Agent, or Firm — Hauptman Ham, LLP

(57) ABSTRACT

A 5G platform-oriented node discovery method and system, and an electronic apparatus are provided. A macro eNB sends a measurement configuration parameter to a user equipment, determines a cooperation set and a main transmission point base on a measurement report, schedules resource in real-time through the cooperation set and the main transmission point; when the user equipment moves, transmits a modified measurement configuration parameter, and determines a new cooperation set and a target transmission point of the new cooperation set base on the measurement report, schedules resources in real-time through the new cooperation set and the target transmission point.

10 Claims, 3 Drawing Sheets

(51) Int. Cl.
*H04B 17/336* (2015.01)
*H04L 5/00* (2006.01)
*H04W 24/10* (2009.01)

(56) References Cited

U.S. PATENT DOCUMENTS

| | | | | |
|---|---|---|---|---|
| 9,379,861 | B2 * | 6/2016 | Seki | H04L 5/0035 |
| 9,438,392 | B2 * | 9/2016 | Takano | H04W 48/18 |
| 9,571,244 | B2 * | 2/2017 | Takano | H04W 24/10 |
| 9,722,742 | B2 * | 8/2017 | Li | H04L 5/0032 |
| 10,148,400 | B2 | 12/2018 | Zhang et al. | |
| 10,257,783 | B2 * | 4/2019 | Qi | H04W 4/70 |
| 10,389,498 | B2 * | 8/2019 | Park | H04L 5/001 |
| 10,485,054 | B2 * | 11/2019 | Tenny | H04B 7/086 |
| 10,536,939 | B2 * | 1/2020 | Chang | H04W 36/00835 |
| 2009/0037570 | A1 * | 2/2009 | Yu | G01D 21/00 709/224 |
| 2012/0069798 | A1 * | 3/2012 | Vitthaladevuni | H04L 1/1854 370/328 |
| 2012/0113950 | A1 * | 5/2012 | Skov | H04L 5/0016 370/329 |
| 2013/0195025 | A1 * | 8/2013 | Chatterjee | H04B 7/0413 370/329 |
| 2013/0301597 | A1 * | 11/2013 | Kim | H04L 5/0048 370/329 |
| 2013/0322273 | A1 * | 12/2013 | Etemad | H04W 28/08 370/252 |
| 2013/0322375 | A1 * | 12/2013 | Chang | H04W 36/00835 370/329 |
| 2013/0336193 | A1 * | 12/2013 | Luo | H04L 5/0035 370/312 |
| 2014/0192734 | A1 * | 7/2014 | Ng | H04L 5/0053 370/329 |
| 2014/0226481 | A1 * | 8/2014 | Dahod | H04W 72/04 370/235 |
| 2014/0328307 | A1 * | 11/2014 | Takano | H04W 48/18 370/329 |
| 2015/0009924 | A1 * | 1/2015 | Takano | H04W 72/06 370/329 |
| 2015/0098411 | A1 * | 4/2015 | Jongren | H04B 7/0482 370/329 |
| 2015/0156751 | A1 * | 6/2015 | Seo | H04B 17/00 370/329 |
| 2015/0173049 | A1 * | 6/2015 | Chen | H04W 72/042 370/329 |
| 2015/0180625 | A1 * | 6/2015 | Park | H04W 72/042 370/329 |
| 2015/0288499 | A1 * | 10/2015 | Nam | H04B 7/0478 370/329 |
| 2015/0318966 | A1 * | 11/2015 | Liu | H04W 28/16 370/329 |
| 2016/0021551 | A1 * | 1/2016 | Park | H04B 7/0619 370/328 |
| 2016/0135194 | A1 * | 5/2016 | Kim | H04L 1/0026 370/329 |
| 2016/0142189 | A1 * | 5/2016 | Shin | H04L 5/0048 370/329 |
| 2017/0142653 | A1 * | 5/2017 | Qi | H04W 88/04 |
| 2017/0214505 | A1 * | 7/2017 | Zhang | H04L 1/0041 |
| 2017/0215097 | A1 * | 7/2017 | Park | H04W 24/02 |
| 2017/0237535 | A1 * | 8/2017 | Park | H04B 7/024 370/329 |
| 2017/0280329 | A1 * | 9/2017 | Sun | H04W 16/14 |
| 2017/0280454 | A1 * | 9/2017 | Kusashima | H04L 5/0055 |
| 2017/0295502 | A1 * | 10/2017 | Stirling-Gallacher | H04B 7/024 |
| 2017/0295508 | A1 * | 10/2017 | Stirling-Gallacher | H04L 5/0048 |
| 2017/0332250 | A1 * | 11/2017 | Ko | H04W 16/32 |
| 2017/0367097 | A1 * | 12/2017 | Sohn | H04W 74/0833 |
| 2018/0302842 | A1 * | 10/2018 | Sugirtharaj | H04L 5/0044 |
| 2018/0323830 | A1 * | 11/2018 | Park | H04B 7/024 |
| 2019/0053013 | A1 * | 2/2019 | Markhovsky | G01S 5/10 |
| 2019/0074953 | A1 * | 3/2019 | Tooher | H04B 7/0617 |
| 2019/0110208 | A1 * | 4/2019 | Xue | H04W 16/14 |
| 2019/0124631 | A1 * | 4/2019 | Ren | H04W 72/0466 |
| 2019/0166607 | A1 * | 5/2019 | Zhou | H04L 25/0228 |
| 2019/0319690 | A1 * | 10/2019 | Tang | H04B 17/336 |
| 2019/0334657 | A1 * | 10/2019 | Zhang | H04L 1/0681 |
| 2019/0349937 | A1 * | 11/2019 | Kusashima | H04L 5/1469 |
| 2020/0052775 | A1 * | 2/2020 | Nam | H04L 5/0062 |

FOREIGN PATENT DOCUMENTS

| | | | | |
|---|---|---|---|---|
| CN | 106165314 A | | 11/2016 | |
| CN | 106792887 A | | 5/2017 | |
| CN | 106792887 A | * | 5/2017 | H04B 7/0626 |
| CN | 109478046 A | * | 3/2019 | H04W 4/70 |
| CN | 109803289 A | * | 5/2019 | H04W 72/12 |
| EP | 3550873 A1 | * | 10/2019 | H04W 72/12 |
| JP | 2011061728 A | * | 3/2011 | H04L 5/0035 |
| JP | 2011193441 A | * | 9/2011 | |
| WO | 2015199414 A1 | | 12/2015 | |
| WO | WO-2015194810 A1 | * | 12/2015 | H04W 36/0055 |
| WO | 2016021993 A2 | | 2/2016 | |
| WO | WO-2018040057 A1 | * | 3/2018 | H04W 4/70 |
| WO | WO-2018099415 A1 | * | 6/2018 | H04B 17/336 |

OTHER PUBLICATIONS

Hybrid CSI Reporting Design Targets, project, Apr. 15, 2016, 3GPP TSG-RAN WG1 #134bis, R1-163081, 3GPP, Busan Korea.
International Search Report dated Mar. 2, 2018, corresponding to International Application No. PCT/CN2017/113780.

* cited by examiner

5G PLATFORM-ORIENTED NODE DISCOVERY METHOD AND SYSTEM, AND ELECTRONIC DEVICE

CROSS REFERENCE TO RELATED APPLICATIONS

This application claims priority of Chinese Patent Application No. 201611095608.2, filed on Dec. 2, 2016, entitled "Node discovery method and system for 5G platform", the entire contents of which are incorporated by reference in this application.

FIELD OF INVENTION

The present invention relates to field of communications, and more particularly to a 5G platform-oriented node discovery method and system, and an electronic apparatus.

BACKGROUND OF INVENTION

Current cell-centric wireless networks can no longer handle ultra-dense networks. With the ultra-dense deployment of users and wireless access nodes, redundancy of a network's transceiver and overlapping coverage features make user-centric wireless technology design possible. On the other hand, the multipath feature of ultra-dense networks provides favorable conditions for joint optimization of access and backhaul. User-centric cell virtualization technology will play a very important role in ultra-dense wireless network technology.

In the ultra-dense networking, the ultra-dense deployment of wireless access nodes is used to improve efficient multiplexing of spectrum resources in space, thereby greatly improving system capacity and coverage performance. When the density of deployment of wireless access nodes increases, the coverage radius of a single wireless access node decreases, causing users to switch between very frequent wireless access nodes when moving in the network. For example, when the coverage radius of the wireless access node is 10 meters, assuming that the user travels at a speed of 30 km/h, the user needs to complete the process of switching from one service node to another in about 1 second. Frequent switching between nodes causes a sharp increase in system signal overhead, and the probability of user handover failures is greatly increased, thereby damaging the user business experience. On the other hand, in the ultra-dense networking, the distance between the wireless access nodes is shortened and the deployment location is extremely irregular, the interference pattern between different types of wireless access nodes randomly placed becomes more complicated, and the superposition of interference intensity is also denser. For the above two problems, the user-centric virtual cell technology is considered to be an effective processing method. The first step to be completed is the virtual cell node discovery and identification technology. However, in existing technology, the identification of the virtual cell node cannot be effectively realized.

SUMMARY OF INVENTION

The embodiments of the present invention provide a node discovery method for facing 5G (5th generation mobile networks) platform and a node discovery system thereof, and an electronic apparatus, which can solve the problem that the prior art cannot effectively identify the virtual cell node.

In a first aspect, an embodiment of the present invention provides an electronic device, including a processor and a memory, the memory configured to store instructions and data, the processor used to perform the following steps:

a macro eNB (enhanced Node B) transmitting a measurement configuration parameter to a user equipment, and determining a cooperation set of the user equipment and a main transmission point base on a measurement report reported by the user equipment, steps of scheduling resources in real-time through the cooperation set and the main transmission point, including: the macro eNB transmitting a measure information to the user equipment, so that the user equipment reporting a CRS-RSRP (Cell Specific Reference—Reference Signal Received Power) and an RSRQ (Reference Signal Received Quality) for a serving cell and an adjacent cell in accordance with the measurement information; the macro eNB determining a location of the user equipment base on the measurement report reported by the user equipment; the macro eNB negotiating with a virtual cell to configure a CSI-RS (Channel State Information—Reference Signal) resource; the macro eNB transmitting the measurement configuration parameter to the user equipment; the user equipment implementing a measurement for the CSI-RS resource after receiving the measurement configuration parameter;

when the user equipment moves, the macro eNB transmits a modified measurement configuration parameter, and determines a new cooperation set of the user equipment and a target transmission point of the new cooperation set base on the measurement report reported by the user equipment, scheduling resources in real-time through the new cooperation set and the target transmission point.

Wherein after the step of the user equipment implementing a measurement for the CSI-RS resource after receiving the measurement configuration parameter further includes:

after the macro eNB receiving the measurement report from the user equipment, the macro eNB determining the cooperation set of the user equipment according to the CSI-RS RSRP in the measurement report, and determining the main transmission point in the cooperation set at the same time;

the macro eNB notifying the virtual cell of the determined cooperation set and the main transmission point;

the macro eNB transmitting a CSI feedback configuration parameter to the user equipment;

the user equipment evaluating the CSI of the cooperation set in real-time according to the CSI feedback configuration parameter, and reporting to the main transmission point;

the main transmission point scheduling resources in real-time according to a CSI evaluation information reported by the user equipment, realizing a data interaction with the user equipment.

Wherein the step of after the macro eNB receiving the measurement report from the user equipment, the macro eNB determining the cooperation set of the user equipment according to the CSI-RS RSRP in the measurement report, and determining the main transmission point in the cooperation set at the same time includes:

after the macro eNB receiving the measurement report, the macro eNB determining the cooperation set of the user equipment according to a size of the CSI-RS RSRP in the measurement report reported by the user equipment, the macro eNB determining the main transmission point in the cooperation set at the same time; when a number of the CSI-RS resources in the measurement report reported by the user equipment meets a reporting condition that is greater than a number N of a size of the cooperation set, the macro eNB selecting the first N transmission points with the largest RSRP value as the cooperation set.

Wherein the step of the macro eNB notifying the virtual cell of the determined cooperation set and the main transmission point includes:

the macro eNB notifying the virtual cell of the cooperation set determined by the user equipment, and notifying the virtual cell of the main transmission point of the user equipment, so that the virtual cell configuring a specific parameter for the user equipment, so that the user equipment implementing a scrambling when interacting with the main transmission point; the virtual cell also configuring a channel information feedback parameter of the user equipment in accordance with the cooperation set.

Wherein the step of when the user equipment moves, the macro eNB transmits the modified measurement configuration parameter, and determines the new cooperation set and the target transmission point of the new cooperation set base on the measurement report reported by the user equipment, scheduling resources in real-time through the new cooperation set and the target transmission point includes:

the macro eNB determining a new location of the user equipment;

the macro eNB negotiating with the virtual cell to reconfigure the CSI-RS resources;

the macro eNB modifying the measurement configuration parameter according to reconfigured CSI-RS resources, and transmitting the modified measurement configuration parameter to the user equipment;

the user equipment implementing the measurement for the reconfigured CSI-RS resources after the user equipment receiving the modified measurement configuration parameter.

Wherein the step of the macro eNB determining the new location of the user equipment further includes:

the macro eNB determining the location of the user equipment according to an arrival angle of a sounding signal reported by the user equipment.

Wherein after the step of the user equipment implementing the measurement for the reconfigured CSI-RS resources after the user equipment receiving the modified measurement configuration parameter further includes:

after the macro eNB receiving the measurement report from the user equipment, the macro eNB determining the new cooperation set of the user equipment according to the CSI-RS RSRP in the measurement report, and determining the target transmission point in the new cooperation set at the same time;

the macro eNB notifying the virtual cell of the determined new cooperation set and the target transmission point;

the macro eNB transmitting the CSI feedback configuration parameter to the user equipment;

the user equipment evaluating the CSI of the new cooperation set in real-time according to the CSI feedback configuration parameter, and reporting to the target transmission point; and the target transmission point scheduling resources in real-time according to the CSI evaluation information reported by the user equipment, realizing a data interaction with the user equipment.

Wherein after the step of the macro eNB notifying the virtual cell of the determined new cooperation set and the target transmission point further includes:

using an independent signal to notify a source cooperation set of a moving information of the user equipment, and notify a source main transmission point to forward the data that are not successfully transmitted by the user equipment to the target transmission point.

In a second aspect, an embodiment of the present invention provides a node discovery method for facing 5G platform, including steps of:

a macro eNB transmitting a measurement configuration parameter to a user equipment, and determining a cooperation set of the user equipment and a main transmission point base on a measurement report reported by the user equipment, scheduling resources in real-time through the cooperation set and the main transmission point;

when the user equipment moves, the macro eNB transmits a modified measurement configuration parameter, and determines a new cooperation set and a target transmission point of the new cooperation set base on the measurement report reported by the user equipment, scheduling resources in real-time through the new cooperation set and the target transmission point.

The node discovery method for facing 5G platform, wherein the step of the macro eNB transmitting the measurement configuration parameter to the user equipment, and determining the cooperation set of the user equipment and the main transmission point base on a measurement report reported by the user equipment, scheduling resources in real-time through the cooperation set and the main transmission point includes:

the macro eNB determining a location of the user equipment;

the macro eNB negotiating with a virtual cell to configure a CSI-RS (Channel State Information Reference Signal) resource;

the macro eNB transmitting the measurement configuration parameter to the user equipment; and the user equipment implementing a measurement for the CSI-RS resource after receiving the measurement configuration parameter.

The node discovery method for facing 5G platform, wherein after the step of the user equipment implementing a measurement for the CSI-RS resource after receiving the measurement configuration parameter further includes:

after the macro eNB receiving the measurement report from the user equipment, the macro eNB determining the cooperation set of the user equipment according to the CSI-RS RSRP in the measurement report, and determining the main transmission point in the cooperation set at the same time;

the macro eNB notifying the virtual cell of the determined cooperation set and the main transmission point;

the macro eNB transmitting a CSI feedback configuration parameter to the user equipment;

the user equipment evaluating the CSI of the cooperation set in real-time according to the CSI feedback configuration parameter, and reporting to the main transmission point;

the main transmission point scheduling resources in real-time according to a CSI evaluation information reported by the user equipment, realizing a data interaction with the user equipment.

The node discovery method for facing 5G platform, wherein the step of when the user equipment moves, the macro eNB transmits the modified measurement configuration parameter, and determines the new cooperation set and the target transmission point of the new cooperation set base on the measurement report reported by the user equipment, scheduling resources in real-time through the new cooperation set and the target transmission point includes:

the macro eNB determining a new location of the user equipment;

the macro eNB negotiating with the virtual cell to configure the CSI-RS resource;

the macro eNB modifying the measurement configuration parameter according to a reconfigured CSI-RS resource, and transmitting the modified measurement configuration parameter to the user equipment;

the user equipment implementing the measurement for the reconfigured CSI-RS resource after the user equipment receiving the modified measurement configuration parameter.

The node discovery method for facing 5G platform, wherein after the step of the user equipment implementing the measurement for the reconfigured CSI-RS resource after the user equipment receiving the modified measurement configuration parameter further includes:

after the macro eNB receiving the measurement report from the user equipment, the macro eNB determining the new cooperation set of the user equipment according to the CSI-RS RSRP in the measurement report, and determining the target transmission point in the new cooperation set at the same time;

the macro eNB notifying the virtual cell of the determined new cooperation set and the target transmission point;

the macro eNB transmitting the CSI feedback configuration parameter to the user equipment;

the user equipment evaluating the CSI of the new cooperation set in real-time according to the CSI feedback configuration parameter, and reporting to the target transmission point; and the target transmission point scheduling resources in real-time according to the CSI evaluation information reported by the user equipment, realizing a data interaction with the user equipment.

The node discovery method for facing 5G platform, wherein the step of the macro eNB determining the new location of the user equipment further includes:

the macro eNB determining the location of the user equipment according to an arrival angle of a sounding signal reported by the user equipment.

The node discovery method for facing 5G platform, wherein after the step of the macro eNB notifying the virtual cell of the determined new cooperation set and the target transmission point further includes:

using an independent signal to notify a source cooperation set of a moving information of the user equipment, and notify a source main transmission point to forward the data that the user equipment has not successfully transmitted to the target transmission point.

In a third aspect, an embodiment of the present invention provides a node discovery system for facing 5G platform, including:

one or a plurality of processors;

a memory; and one or a plurality of applications, wherein the one or a plurality of applications stored in the memory and configured to be executed by the processor; the one or a plurality of applications including:

an identity measurement module, used for transmitting a measurement configuration parameter to a user equipment, and determining a cooperation set of the user equipment and a main transmission point base on a measurement report reported by the user equipment, scheduling resources in real-time through the cooperation set and the main transmission point;

a change identification module, used for when the user equipment moves, the macro eNB transmits a modified measurement configuration parameter, and determines a new cooperation set and a target transmission point of the new cooperation set base on the measurement report reported by the user equipment, scheduling resources in real-time through the new cooperation set and the target transmission point.

The node discovery system for facing 5G platform, wherein the identity measurement module includes:

a first location determination unit for determining a location of the user equipment;

a first negotiate configuration unit for negotiating with a virtual cell to configure a CSI-RS (Channel State Information Reference Signal) resource;

a first measurement configuration parameter transmission unit for transmitting the measurement configuration parameter to the user equipment;

a first measurement unit for implementing a measurement for the CSI-RS resource, after receiving the measurement configuration parameter.

The node discovery system for facing 5G platform, wherein the identity measurement module further includes:

a first cooperation set determination unit for determining the cooperation set of the user equipment according to the CSI-RS RSRP in the measurement report, and determining the main transmission point in the cooperation set at the same time, after receiving the measurement report from the user equipment;

a first notification unit for notifying the virtual cell of the determined cooperation set and the main transmission point;

a first feedback parameter transmission unit for transmitting a CSI feedback configuration parameter to the user equipment;

a first evaluation report unit for evaluating the CSI of the cooperation set in real-time according to the CSI feedback configuration parameter, and reporting to the main transmission point;

a first resource scheduling unit for scheduling resources in real-time according to a CSI evaluation information reported by the user equipment, realizing a data interaction with the user equipment.

The node discovery system for facing 5G platform, wherein the change identification module includes:

a second location determination unit for determining a new location of the user equipment;

a second negotiate configuration unit for negotiating with the virtual cell to configure the CSI-RS resource;

a second measurement configuration parameter transmission unit for modifying the measurement configuration parameter according to a reconfigured CSI-RS resource, and transmitting the modified measurement configuration parameter to the user equipment;

a second measurement unit for implementing a measurement for the reconfigured CSI-RS resource, after receiving the measurement configuration parameter.

The node discovery system for facing 5G platform, wherein the change identification module further includes:

a second cooperation set determination unit for determining the new cooperation set of the user equipment according to the CSI-RS RSRP in the measurement report, and determining the main transmission point in the cooperation set at the same time, after receiving the measurement report from the user equipment;

a second notification unit for notifying the virtual cell of the determined new cooperation set and the target transmission point;

a second feedback parameter transmission unit for transmitting the CSI feedback configuration parameter to the user equipment;

a second evaluation report unit for evaluating the CSI of the new cooperation set in real-time according to the CSI feedback configuration parameter, and reporting to the main transmission point;

a second resource scheduling unit for scheduling resources in real-time according to the CSI evaluation information reported by the user equipment, realizing a data interaction with the user equipment.

Beneficial effects: the present invention fully utilizes the advantage of "almost synchronization" of adjacent wireless access nodes in an ultra-dense deployment, and implements a user-centric identity management mechanism for virtual cells, and the wireless access node and its identification measurement mechanism during the cooperation set change process. The transmission performance and mobility performance of the UDN (Ultra Dense Network) system can be improved by the method of the present invention.

DETAILED DESCRIPTION OF PREFERRED EMBODIMENTS

The present invention provides a node discovery method for facing 5G platform and a node discovery system thereof, for the purposes of the present invention, technical solutions and advantages clearer, explicit, the following detailed description of the present invention further. It should be understood that the specific embodiments described herein are only intended to illustrate the present invention and are not intended to limit the present invention.

Figure 1:
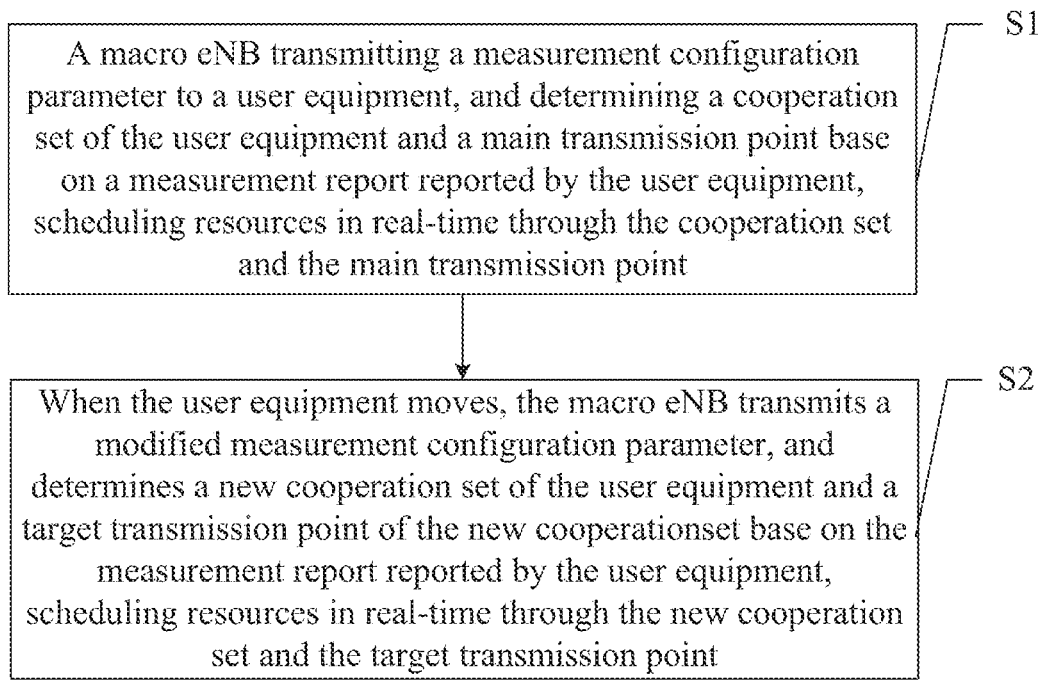
FIG. 1 is a flowchart of a preferred embodiment of a node discovery method for facing 5G platform according to the present invention.

Please refer to FIG. 1, FIG. 1 is a flowchart of a preferred embodiment of a node discovery method for facing 5G platform according to the present invention, as shown in the figure, the method includes:

Step S1, a macro eNB transmitting a measurement configuration parameter to a user equipment, and determining a cooperation set of the user equipment and a main transmission point base on a measurement report reported by the user equipment, scheduling resources in real-time through the cooperation set and the main transmission point.

Step S2, when the user equipment moves, the macro eNB transmits a modified measurement configuration parameter, and determines a new cooperation set and a target transmission point of the new cooperation set base on the measurement report reported by the user equipment, scheduling resources in real-time through the new cooperation set and the target transmission point.

Figure 2:
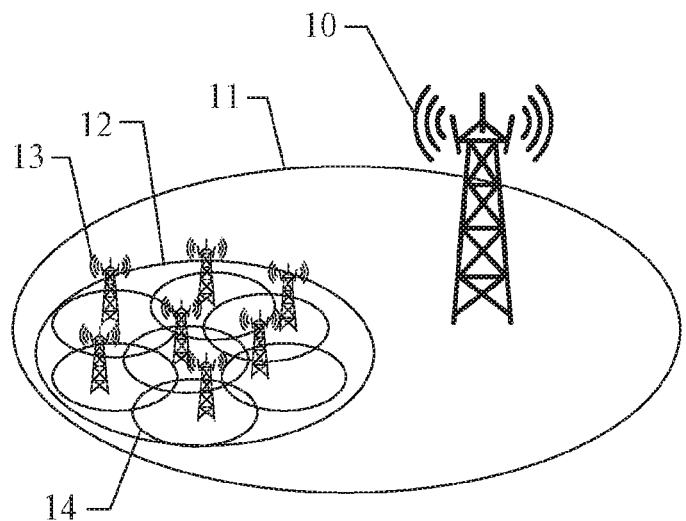
FIG. 2 is a schematic diagram of a two-layer network architecture according to an embodiment of the present invention.

In the present invention, the identification measurement is implemented based on a user-centric identity management mechanism in a two-layer heterogeneous network. As shown in FIG. 2, in the two-layer heterogeneous network architecture, the macro eNB 10 is responsible for coverage (the cell managed by the macro eNB 10 is called a macro cell 11), and mainly transmits control signal and data, the densely deployed micro base station 13 is responsible for data transmission. In the two-layer network architecture of the present invention, a plurality of micro cells 14 can form a virtual cell 12, and the micro base stations 13 in the virtual cell 12 can perform cooperative processing. In ultra-dense networks, adjacent wireless access nodes have "almost synchronized" characteristics due to the ultra-dense deployment of transport nodes. Therefore, the present invention fully utilizes the advantage of "almost synchronization" of adjacent wireless access nodes in an ultra-dense deployment, and implements a user-centric identity management mechanism for virtual cells, and the wireless access node and its identification measurement mechanism during the cooperation set change process. It is of great significance to improve the transmission performance and mobility performance of UDN system.

Specifically, the step S1 specifically includes:

Step S11, the macro eNB determines the location of the user equipment;

Step S12, the macro eNB negotiates with the virtual cell to configure CSI-RS resources;

Step S13, the macro eNB transmits a measurement configuration parameter to the user equipment;

Step S14, the user equipment implementing a measurement for the CSI-RS resource after receiving the measurement configuration parameter.

Figure 3:
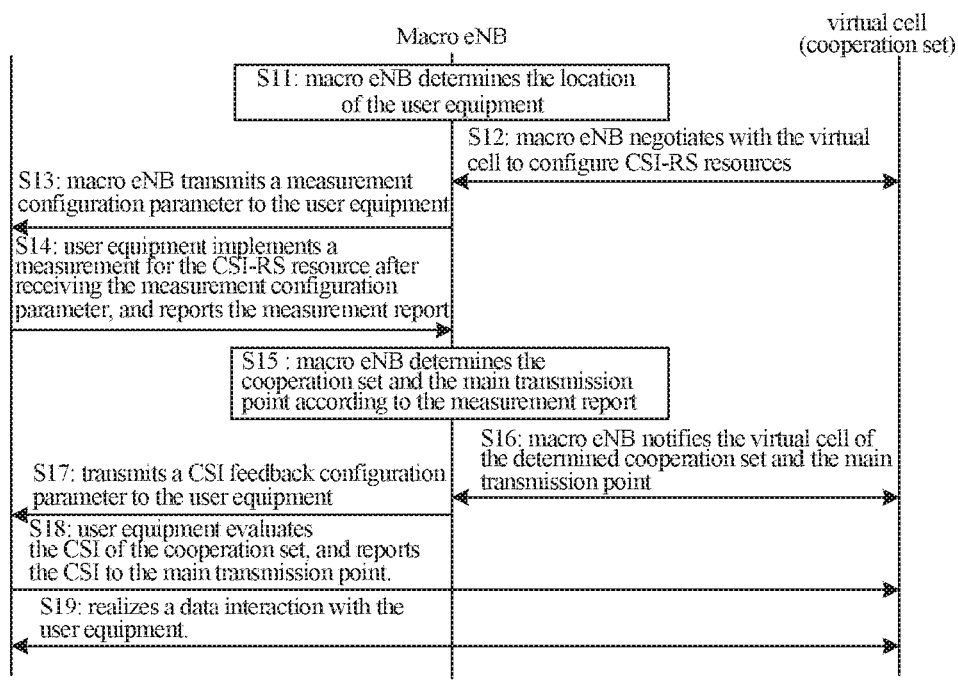
FIG. 3 is a specific flowchart of step S1 according to an embodiment of the present invention.

As shown in FIG. 3, in the step S11, the user equipment (User Equipment, UE) has access to the cell managed by the macro eNB, and an RRC (Radio Resource Control) connection is established. The macro eNB usually needs to transmit the measurement information to the user equipment so that the user equipment can perform the necessary measurements to meet the mobility requirements. The user equipment reporting a CRS-RSRP (Cell Specific Reference—Reference Signal Received Power) and an RSRQ (Reference Signal Received Quality) for a serving cell and an adjacent cell in accordance with the measurement information. According to the measurement report reported by the user equipment, the macro eNB can roughly determine the location of the user equipment. The user equipment usually reports a sounding signal (Sounding) so that the base station can know the status of the uplink channel. The macro eNB can also determine the (roughly) location of the user equipment according to an arrival angle of the sounding signal (Sounding) reported by the user equipment.

In the step S12, the macro eNB negotiates with the virtual cell to configure a CSI-RS (Channel State Information Reference Signal) resource, and different transmission points are configured with different CSI-RS resources. Because the macro eNB has obtained the roughly location of the user equipment, the macro eNB only needs to negotiate the configuration of the CSI-RS resources with the transmission point in the location area.

In the step S13, the macro eNB transmits a measurement configuration parameter to the user equipment, the user equipment uses the measurement configuration parameter to measure the CSI-RS resources transmitted by the transmission point. The measurement configuration parameter may include frequency information of the transmission point, and the measurement configuration parameters corresponding to different CSI-RS resources include a time-frequency parameter and a reporting condition, and the like. The reporting condition may be whether the measured RSRP of the CSI-RS resource exceeds a predetermined threshold, and if the reporting condition is met, the reporting is performed. The macro eNB can complete the configuration of the measurement configuration parameter through an RRC connection reconfiguration signal.

In the step S14, the user equipment implementing a measurement for the CSI-RS resource after receiving the measurement configuration parameter. If there is a CSI-RS resource that meets the reporting condition, the user equipment needs to report the measurement report. In the measurement report, one or more CSI-RS resources satisfying the reporting condition may be included.

Further, the step S1 further includes:

Step 15, after the macro eNB receiving the measurement report from the user equipment, the macro eNB determines the cooperation set of the user equipment according to the CSI-RS RSRP in the measurement report, and determines the main transmission point in the cooperation set at the same time;

Step 16, the macro eNB notifies the virtual cell of the determined cooperation set and the main transmission point;

Step 17, the macro eNB transmits a CSI feedback configuration parameter to the user equipment;

Step 18, the user equipment evaluates the CSI of the cooperation set in real-time according to the CSI feedback configuration parameter, and reports to the main transmission point;

S19, the main transmission point schedules resources in real-time according to a CSI evaluation information reported by the user equipment, realizing a data interaction with the user equipment.

As shown in FIG. 3, in the step S15, after receiving the measurement report, the macro eNB determines the cooperation set of the user equipment according to the size of the CSI-RS RSRP in the measurement report reported by the user equipment, and the macro eNB can determine the cooperation set. Main transmission point (Master Transport Point). The size of the cooperation set depends on the processing power of the main transmission point. Assume that the size of the cooperation set is three, and there are six CSI-RS resources in the measurement report reported by the user equipment that meet the reporting conditions. Generally, the macro eNB selects the first three transmission points with the largest RSRP value as the cooperation set, and the transmission points corresponding to the other three CSI-RS resources are the interference sources for the user equipment.

In the step S16, the macro eNB notifies the virtual cell of the cooperation set determined by the user equipment, and notifies the virtual cell of the main transmission point of the user equipment. The virtual cell configures a specific parameter, such as a virtual cell identifier, for the user equipment when the processing resource is sufficient, so that the user equipment implements a scrambling when interacting with the main transmission point. The virtual cell also configures the channel state information (CSI) feedback parameters of the user equipment for the cooperation set.

In the step S17, the macro eNB notifies the user equipment of the CSI feedback configuration parameter for the cooperation set, and/or the specific parameter that the virtual cell is configured for the user equipment.

In the step S18, the UE implements the CSI evaluation for the cooperation set according to the CSI feedback configuration parameter, and can also report the CSI information to the main transmission point in a specific subframe.

In the step S19, the main transmission point implements resource scheduling according to the CSI information reported by the user equipment, and implements data interaction with the user equipment. Because user equipment reports CSI for different transmission points in the cooperation set, the main transmission point can implement centralized scheduling within the cooperation set to obtain good cooperation effects and interference suppression effects, and improve the spectrum efficiency of transmission.

Specifically, the step S2 specifically includes:

Step S21, the macro eNB determining a new location of the user equipment;

Step S22, the macro eNB negotiating with the virtual cell to reconfigure the CSI-RS resources;

Step S23, the macro eNB modifying the measurement configuration parameter according to reconfigured CSI-RS resources, and transmitting the modified measurement configuration parameter to the user equipment;

Step S24, the user equipment implementing the measurement for the reconfigured CSI-RS resources after the user equipment receiving the modified measurement configuration parameter.

Figure 4:
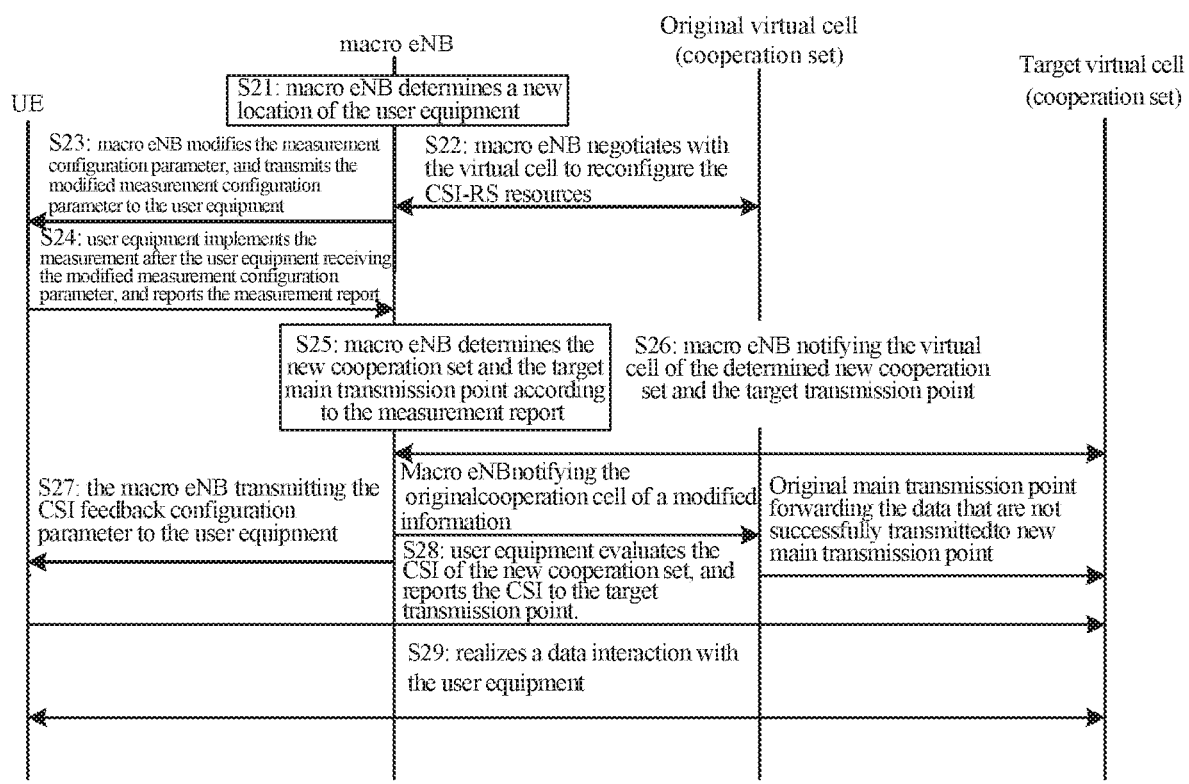
FIG. 4 is a specific flowchart of step S2 according to an embodiment of the present invention.

As shown in FIG. 4, the principle of step S21 is the same as that of the aforementioned step S11. The user equipment has a new location after moving, the macro eNB can determine the location of the user equipment according to the arrival angle of the sounding signal reported by the user equipment.

In the step S22, after the location is determined, the configuration of the CSI-RS resource can be negotiated with the transmission point in the location area.

In the step S23, the macro eNB modifies the measurement configuration parameter according to the movement of the user equipment, such as adding or deleting the CSI-RS resources of different transmission points. The macro eNB only needs to notify the user equipment of the CSI-RS resources transmitted by the transmission points around the user equipment.

In the step S24, the user equipment re-implements the measurement for the CSI-RS resource according to the new measurement configuration parameter, and evaluates whether the measured CSI-RS resource satisfies the reporting condition, and if yes, reports the measurement report.

Further, the step S2 further includes:

Step 25, after the macro eNB receiving the measurement report from the user equipment, the macro eNB determining the new cooperation set of the user equipment according to the CSI-RS RSRP in the measurement report, and determining the target transmission point in the new cooperation set at the same time;

Step 26, the macro eNB notifying the virtual cell of the determined new cooperation set and the target transmission point;

Step 27, the macro eNB transmitting the CSI feedback configuration parameter to the user equipment;

Step 28, the user equipment evaluating the CSI of the new cooperation set in real-time according to the CSI feedback configuration parameter, and reporting to the target transmission point;

Step 29, the target transmission point scheduling resources in real-time according to the CSI evaluation information reported by the user equipment, realizing a data interaction with the user equipment.

As shown in FIG. 4, in the step S25, after receiving the measurement report, the macro eNB determines the new cooperation set according to the CSI-RS RSRP reported by the user equipment, and also determines the target transmission point in the new cooperation set. (This target transmission point can also be called the target main transmission point, and the original main transmission point can be called the source main transmission point).

In the step S26, the macro eNB notifies the virtual cell of the new cooperation set determined by the user equipment, and notifies the virtual cell of the target transmission point of the user equipment. The virtual cell will configure the CSI feedback parameters of the user equipment for the new cooperation set. To ensure that the user equipment can be smoothly switched during the change of the cooperation set, the virtual cell uses the specific parameter originally configured for the user equipment, such as the virtual cell identifier.

In the step S27, the macro eNB notifies the user equipment of the CSI feedback configuration parameter for the new cooperation set. After the step S26, the macro eNB may use independent signal to notify the original cooperation set of a moving information of the user equipment, and notify the source main transmission point to forward the data that the user equipment has not successfully transmitted to the target transmission point.

In the step S28, the user equipment implements the CSI evaluation for the new cooperation set according to the CSI feedback configuration parameter, and can also report the CSI information to the target transmission point in a specific subframe.

In the step S29, the target transmission point implements resource scheduling according to the CSI information reported by the number of users, and implements data interaction with the user equipment. Since the target transmission point still uses the specific parameter originally configured for the user equipment, the user equipment does not have the interruption of the data transmission caused by the existing switching process during the change of the cooperation set.

In the existing switching process, random access needs to be introduced to obtain the Time Advance (TA) of the user equipment for the target cell. In the ultra-dense network, the distance between the source device and the target main transmission point is not much different, so that the original TA value can continue to be used. Or the main transmission point knows in advance the sounding signal transmitted by the user equipment, so that the user equipment is notified to the macro eNB for the TA of the main transmission point in the above step S26, and the macro equipment is notified by the macro eNB.

Based on the foregoing method, the present invention further provides a preferred embodiment of a node discovery system for facing 5G platform, including:

an identity measurement module, used for transmitting a measurement configuration parameter to a user equipment, and determining a cooperation set of the user equipment and a main transmission point base on a measurement report reported by the user equipment, scheduling resources in real-time through the cooperation set and the main transmission point, specifically as described above.

a change identification module, used for when the user equipment moves, the macro eNB transmits a modified measurement configuration parameter, and determines a new cooperation set and a target transmission point of the new cooperation set base on the measurement report reported by the user equipment, scheduling resources in real-time through the new cooperation set and the target transmission point, specifically as described above.

Further, the identity measurement module specifically includes:

A first location determination unit for determining a location of the user equipment, specifically as described above.

A first negotiate configuration unit for negotiating with a virtual cell to configure a CSI-RS resource, specifically as described above.

A first measurement configuration parameter transmission unit for transmitting the measurement configuration parameter to the user equipment, specifically as described above.

A first measurement unit for implementing a measurement for the CSI-RS resource, after receiving the measurement configuration parameter, specifically as described above.

Further, the identity measurement module further includes:

A first cooperation set determination unit for determining the cooperation set of the user equipment according to the CSI-RS RSRP in the measurement report, and determining the main transmission point in the cooperation set at the same time, after receiving the measurement report from the user equipment, specifically as described above.

A first notification unit for notifying the virtual cell of the determined cooperation set and the main transmission point, specifically as described above.

A first feedback parameter transmission unit for transmitting a CSI feedback configuration parameter to the user equipment, specifically as described above.

A first evaluation report unit for evaluating the CSI of the cooperation set in real-time according to the CSI feedback configuration parameter, and reporting to the main transmission point, specifically as described above.

A first resource scheduling unit for scheduling resources in real-time according to a CSI evaluation information reported by the user equipment, realizing a data interaction with the user equipment, specifically as described above.

Further, the change identification module specifically includes:

A second location determination unit for determining a new location of the user equipment, specifically as described above.

A second negotiate configuration unit for negotiating with the virtual cell to configure the CSI-RS resource, specifically as described above.

A second measurement configuration parameter transmission unit for modifying the measurement configuration parameter according to a reconfigured CSI-RS resource, and transmitting the modified measurement configuration parameter to the user equipment, specifically as described above.

A second measurement unit for implementing a measurement for the reconfigured CSI-RS resource, after receiving the measurement configuration parameter, specifically as described above.

Further, the change identification module further includes:

A second cooperation set determination unit for determining the new cooperation set of the user equipment according to the CSI-RS RSRP in the measurement report, and determining the main transmission point in the cooperation set at the same time, after receiving the measurement report from the user equipment, specifically as described above.

A second notification unit for notifying the virtual cell of the determined new cooperation set and the target transmission point, specifically as described above.

A second feedback parameter transmission unit for transmitting the CSI feedback configuration parameter to the user equipment, specifically as described above.

A second evaluation report unit for evaluating the CSI of the new cooperation set in real-time according to the CSI feedback configuration parameter, and reporting to the main transmission point, specifically as described above.

A second resource scheduling unit for scheduling resources in real-time according to the CSI evaluation information reported by the user equipment, realizing a data interaction with the user equipment, specifically as described above.

The technical details of the above modular unit have been described in detail in the foregoing methods, it will not be repeated.

In summary, the present invention fully utilizes the advantage of "almost synchronization" of adjacent wireless access nodes in an ultra-dense deployment, and implements a user-centric identity management mechanism for virtual cells, and the wireless access node and its identification measurement mechanism during the cooperation set change process. The transmission performance and mobility performance of the UDN system can be improved by the method of the present invention.

An embodiment of the present invention also provides a storage medium storing a computer program, wherein the computer program causes a computer to execute a node discovery method for facing 5G platform as described above.

Those of ordinary skill in the art can appreciate that various embodiments of the method of the above-described embodiments all or part of the steps may be by a program instructing relevant hardware to complete, the program may be stored in a computer-readable storage medium, the storage medium may include: a read only memory (ROM, Read Only memory), a memory such as a random access (RAM, random access memory), magnetic or optical disk.

Figure 5:
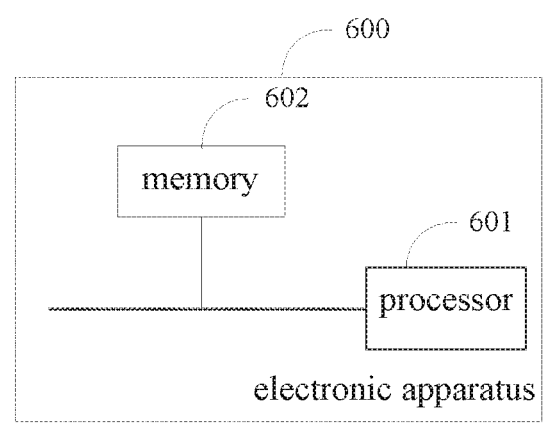
FIG. 5 is a schematic structural diagram of an electronic apparatus according to an embodiment of the present invention.

An embodiment of the present application further provides an electronic apparatus (such as the macro eNB mentioned in the embodiment of the present invention). Referring to FIG. 5, the electronic apparatus 600 includes a processor 601 and a memory 602. Wherein, the processor 601 is electrically connected to the memory 602.

The processor 601 is a control center of the electronic device 600, and connects various parts of the entire electronic device by using various interfaces and lines. The processor performs various functions of the electronic device 600 and process data by running or loading a computer program stored in the memory 602 and calling data stored in the memory 602, thereby entirely monitors the electronic device 600.

The memory 602 can be configured to store software programs and modules. The processor 601 executes various functional applications and data processing by running computer programs and modules stored in the memory 602. The memory 602 may mainly include a storage program area and a storage data area, wherein the storage program area may store an operating system, a computer program required for at least one function (such as a sound playing function, an image playing function, etc.), and the like. The storage data area can store data created according to the use of the electronic device, etc. Further, the memory 602 may include a high speed random access memory, and may also include a nonvolatile memory such as at least one disk memory device, a flash memory device, or other volatile solid state memory device. Correspondingly, the memory 602 may further include a memory controller to provide access of the processor 601 to the memory 602.

In the embodiment of the present application, the processor 601 in the electronic apparatus 600 loads the instruction corresponding to the process of one or more computer programs into the memory 602 according to the following steps, and the processor 601 runs the computer program stored in the memory 602, thereby implementing various functions, as follows:

A macro eNB transmitting a measurement configuration parameter to a user equipment, and determining a cooperation set of the user equipment and a main transmission point base on a measurement report reported by the user equipment, steps of scheduling resources in real-time through the cooperation set and the main transmission point, including: the macro eNB transmitting a measure information to the user equipment, so that the user equipment reporting a CRS-RSRP (Cell Specific Reference—Reference Signal Received Power) and an RSRQ (Reference Signal Received Quality) for a serving cell and an adjacent cell in accordance with the measurement information; the macro eNB determining a location of the user equipment base on the measurement report reported by the user equipment; the macro eNB negotiating with a virtual cell to configure a CSI-RS (Channel State Information—Reference Signal) resource; the macro eNB transmitting the measurement configuration parameter to the user equipment; the user equipment implementing a measurement for the CSI-RS resource after receiving the measurement configuration parameter.

When the user equipment moves, the macro eNB transmits a modified measurement configuration parameter, and determines a new cooperation set of the user equipment and a target transmission point of the new cooperation set base on the measurement report reported by the user equipment, scheduling resources in real-time through the new cooperation set and the target transmission point.

In some embodiments, after the step of the user equipment implementing a measurement for the CSI-RS resource after receiving the measurement configuration parameter further includes:

after the macro eNB receiving the measurement report from the user equipment, the macro eNB determining the cooperation set of the user equipment according to the CSI-RS RSRP in the measurement report, and determining the main transmission point in the cooperation set at the same time;

the macro eNB notifying the virtual cell of the determined cooperation set and the main transmission point;

the macro eNB transmitting a CSI feedback configuration parameter to the user equipment;

the user equipment evaluating the CSI of the cooperation set in real-time according to the CSI feedback configuration parameter, and reporting to the main transmission point;

the main transmission point scheduling resources in real-time according to a CSI evaluation information reported by the user equipment, realizing a data interaction with the user equipment.

In some embodiments, after the macro eNB receiving the measurement report from the user equipment, the macro eNB determining the cooperation set of the user equipment according to the CSI-RS RSRP in the measurement report, and determining the main transmission point in the cooperation set at the same time includes:

after the macro eNB receiving the measurement report, the macro eNB determining the cooperation set of the user equipment according to a size of the CSI-RS RSRP in the measurement report reported by the user equipment, the macro eNB determining the main transmission point in the cooperation set at the same time; when a number of the CSI-RS resources in the measurement report reported by the user equipment meets a reporting condition that is greater than a number N of a size of the cooperation set, the macro eNB selecting the first N transmission points with the largest RSRP value as the cooperation set.

In some embodiments, the step of the macro eNB notifying the virtual cell of the determined cooperation set and the main transmission point includes:

the macro eNB notifying the virtual cell of the cooperation set determined by the user equipment, and notifying the virtual cell of the main transmission point of the user equipment, so that the virtual cell configuring a specific parameter for the user equipment, so that the user equipment implementing a scrambling when interacting with the main transmission point; the virtual cell also configuring a channel information feedback parameter of the user equipment in accordance with the cooperation set.

In some embodiments, the step of when the user equipment moves, the macro eNB transmits the modified measurement configuration parameter, and determines the new cooperation set and the target transmission point of the new cooperation set base on the measurement report reported by the user equipment, scheduling resources in real-time through the new cooperation set and the target transmission point includes:

the macro eNB determining a new location of the user equipment;

the macro eNB negotiating with the virtual cell to reconfigure the CSI-RS resources;

the macro eNB modifying the measurement configuration parameter according to reconfigured CSI-RS resources, and transmitting the modified measurement configuration parameter to the user equipment;

the user equipment implementing the measurement for the reconfigured CSI-RS resources after the user equipment receiving the modified measurement configuration parameter.

In some embodiments, the step of the macro eNB determining the new location of the user equipment further includes:

the macro eNB determining the location of the user equipment according to an arrival angle of a sounding signal reported by the user equipment.

In some embodiments, after the step of the user equipment implementing the measurement for the reconfigured CSI-RS resources after the user equipment receiving the modified measurement configuration parameter further includes:

after the macro eNB receiving the measurement report from the user equipment, the macro eNB determining the new cooperation set of the user equipment according to the CSI-RS RSRP in the measurement report, and determining the target transmission point in the new cooperation set at the same time;

the macro eNB notifying the virtual cell of the determined new cooperation set and the target transmission point;

the macro eNB transmitting the CSI feedback configuration parameter to the user equipment;

the user equipment evaluating the CSI of the new cooperation set in real-time according to the CSI feedback configuration parameter, and reporting to the target transmission point;

the target transmission point scheduling resources in real-time according to the CSI evaluation information reported by the user equipment, realizing a data interaction with the user equipment.

In some embodiments, after the step of the macro eNB notifying the virtual cell of the determined new cooperation set and the target transmission point further includes:

using an independent signal to notify a source cooperation set of a moving information of the user equipment, and notify a source main transmission point to forward the data that are not successfully transmitted by the user equipment to the target transmission point.

In summary, the present invention fully utilizes the advantage of "almost synchronization" of adjacent wireless access nodes in an ultra-dense deployment, and implements a user-centric identity management mechanism for virtual cells, and the wireless access node and its identification measurement mechanism during the cooperation set change process. The transmission performance and mobility performance of the UDN system can be improved by the method of the present invention.

It should be appreciated that the present invention is applied is not limited to the above-described example, those of ordinary skill in the art, can be modified or converted according to the above description, all such modifications and variations shall fall within the appended claims of the invention protected range.

What is claimed is:

1. An electronic apparatus, comprising:
 a memory, the memory configured to store instructions and data, and
 a processor, the processor configured to execute the instructions stored in the memory to perform the following steps:
 transmitting, by a macro eNB (enhanced Node B), a measurement configuration parameter to a user equipment,
 determining, by a macro eNB, a cooperation set of the user equipment and a main transmission point based on a measurement report reported by the user equipment, and
 scheduling, by a macro eNB, resources in real-time through the cooperation set and the main transmission point,
 wherein, the steps of transmitting, determining and scheduling further comprising:
 reporting, by the user equipment, a CRS-RSRP (Cell Specific Reference—Reference Signal Received Power) and an RSRQ (Reference Signal Received Quality) measurements for a serving cell and an adjacent cell in accordance with the measurement configuration parameter;
 determining, by the macro eNB, a location of the user equipment based on the measurement report reported by the user equipment;
 negotiating, by the macro eNB, with a virtual cell to configure a CSI-RS (Channel State Information Reference Signal) resource;
 transmitting, by the macro eNB, the measurement configuration parameter to the user equipment;
 implementing, by the user equipment, a measurement for the CSI-RS resource after receiving the measurement configuration parameter; and
 when the user equipment moves to a new location, the processor to perform the following steps:
 transmitting, by the macro eNB, a modified measurement configuration parameter,
 determining, by the macro eNB, a new cooperation set of the user equipment and a target transmission point of the new cooperation set based on the measurement report reported by the user equipment,
 scheduling, by the macro eNB, resources in real-time through the new cooperation set and the target transmission point;
 determining, by the macro eNB, the new location of the user equipment;

negotiating, by the macro eNB, with the virtual cell to reconfigure the CSI-RS resources; and implementing, by the user equipment, the measurement for the reconfigured CSI-RS resources after the user equipment receiving the modified measurement configuration parameter, and wherein comprises:

after the macro eNB receiving the measurement report from the user equipment, determining, by the macro eNB, the new cooperation set of the user equipment according to the CSI-RS RSRP in the measurement report, and determining, by the macro eNB, the target transmission point in the new cooperation set at the same time;

notifying, by the macro eNB, the virtual cell of the determined new cooperation set and the target transmission point;

transmitting, by the macro eNB, the CSI feedback configuration parameter to the user equipment;

evaluating, by the user equipment, the CSI of the new cooperation set in real-time according to the CSI feedback configuration parameter;

reporting, by the user equipment, the CSI of the new cooperation set to the target transmission point; and scheduling, by the target transmission point, resources in real-time according to the CSI evaluation information reported by the user equipment, realizing a data interaction with the user equipment.

2. The electronic apparatus according to claim 1, wherein after the step of implementing, by the user equipment, a measurement for the CSI-RS resource after receiving the measurement configuration parameter further comprises:

after the macro eNB receiving the measurement report from the user equipment, determining, by the macro eNB, the cooperation set of the user equipment according to the CSI-RS RSRP in the measurement report, and determining, by the macro eNB, the main transmission point in the cooperation set at the same time;

notifying, by the macro eNB, the virtual cell of the determined cooperation set and the main transmission point;

transmitting, by the macro eNB, a CSI feedback configuration parameter to the user equipment;

evaluating, by the user equipment, the CSI of the cooperation set in real-time according to the CSI feedback configuration parameter, and reporting, by the user equipment, the CSI of the cooperation set to the main transmission point;

scheduling, by the main transmission point, resources in real-time according to a CSI evaluation information reported by the user equipment, realizing a data interaction with the user equipment.

3. The electronic apparatus according to claim 2, wherein the step of after the macro eNB receiving the measurement report from the user equipment, determining, by the macro eNB, the cooperation set of the user equipment according to the CSI-RS RSRP in the measurement report, and determining, by the macro eNB, the main transmission point in the cooperation set at the same time comprises:

after the macro eNB receiving the measurement report, determining, by the macro eNB, the cooperation set of the user equipment according to a size of the CSI-RS RSRP in the measurement report reported by the user equipment;

determining, by the macro eNB, the main transmission point in the cooperation set at the same time; and when a number of the CSI-RS resources in the measurement report reported by the user equipment meets a reporting condition that is greater than a number N of a size of the cooperation set, selecting, by the macro eNB, the first N transmission points with the largest RSRP value as the cooperation set.

4. The electronic apparatus according to claim 1, wherein the step of determining, by the macro eNB, the new location of the user equipment further comprises:

determining, by the macro eNB, the location of the user equipment according to an arrival angle of a sounding signal reported by the user equipment.

5. The electronic apparatus according to claim 1, wherein after the step of notifying, by the macro eNB, the virtual cell of the determined new cooperation set and the target transmission point further comprises:

using an independent signal to notify a source cooperation set of a moving information of the user equipment, and notify a source main transmission point to forward the data that are not successfully transmitted by the user equipment to the target transmission point.

6. A 5G (5th generation mobile networks) platform-oriented node discovery method, comprising steps of:

transmitting, by a macro eNB (enhanced Node B), a measurement configuration parameter to a user equipment, determining, by a macro eNB, a cooperation set of the user equipment and a main transmission point based on a measurement report reported by the user equipment, and scheduling, by a macro eNB, resources in real-time through the cooperation set and the main transmission point; and when the user equipment moves to a new location, transmitting, by the macro eNB, a modified measurement configuration parameter, determining, by the macro eNB, a new cooperation set and a target transmission point of the new cooperation set based on the measurement report reported by the user equipment, scheduling, by the macro eNB, resources in real-time through the new cooperation set and the target transmission point;

wherein the steps of transmitting, determining, and scheduling further comprises:

determining, by the macro eNB, a location of the user equipment;

negotiating, by the macro eNB, with a virtual cell to configure a CSI-RS (Channel State Information Reference Signal) resource;

transmitting, by the macro eNB, the measurement configuration parameter to the user equipment; and implementing, by the user equipment, a measurement for the CSI-RS resource after receiving the measurement configuration parameter;

determining a new, by the macro eNB, location of the user equipment;

negotiating, by the macro eNB, with the virtual cell to configure the CSI-RS resource;

modifying, by the macro eNB, the measurement configuration parameter according to a reconfigured CSI-RS resource;

transmitting, by the macro eNB, the modified measurement configuration parameter to the user equipment; and implementing, by the user equipment, the measurement for the reconfigured CSI-RS resource after the user equipment receiving the modified measurement configuration parameter, and wherein further comprises:
after the macro eNB receiving the measurement report from the user equipment,
determining, by the macro eNB, the new cooperation set of the user equipment according to the CSI-RS RSRP (Reference Signal Received Power) in the measurement report, and determining, by the macro eNB, the target transmission point in the new cooperation set at the same time;
notifying, by the macro eNB, the virtual cell of the determined new cooperation set and the target transmission point;
transmitting, by the macro eNB, the CSI feedback configuration parameter to the user equipment;
evaluating, by the user equipment, the CSI of the new cooperation set in real-time according to the CSI feedback configuration parameter;
reporting, by the user equipment, the CSI of the new cooperation set to the target transmission point; and
scheduling, by the target transmission point, resources in real-time according to the CSI evaluation information reported by the user equipment, realizing a data interaction with the user equipment.

7. The 5G platform-oriented node discovery method according to claim 6, wherein after the step of the user equipment implementing a measurement for the CSI-RS resource after receiving the measurement configuration parameter further comprises:
after the macro eNB receiving the measurement report from the user equipment, the macro eNB determining the cooperation set of the user equipment according to the CSI-RS RSRP in the measurement report, and determining the main transmission point in the cooperation set at the same time;
the macro eNB notifying the virtual cell of the determined cooperation set and the main transmission point;
the macro eNB transmitting a CSI feedback configuration parameter to the user equipment;
the user equipment evaluating the CSI of the cooperation set in real-time according to the CSI feedback configuration parameter, and reporting to the main transmission point;
the main transmission point scheduling resources in real-time according to a CSI evaluation information reported by the user equipment, realizing a data interaction with the user equipment.

8. The 5G platform-oriented node discovery method according to claim 6, wherein the step of determining, by the macro eNB, the new location of the user equipment further comprises:
determining, by the macro eNB, the location of the user equipment according to an arrival angle of a sounding signal reported by the user equipment.

9. The 5G platform-oriented node discovery method according to claim 6, wherein after the step of notifying, by the macro eNB, the virtual cell of the determined new cooperation set and the target transmission point further comprises:
using an independent signal to notify a source cooperation set of a moving information of the user equipment, and notify a source main transmission point to forward the data that the user equipment has not successfully transmitted to the target transmission point.

10. A 5G (5th generation mobile networks) platform-oriented node discovery system comprising:
one or a plurality of processors;
a memory; and
one or a plurality of applications, wherein the one or a plurality of applications stored in the memory and configured to be executed by the processor;
the one or a plurality of applications comprising:
an identity measurement module, used for
transmitting a measurement configuration parameter to a user equipment,
determining a cooperation set of the user equipment and
a main transmission point based on a measurement report reported by the user equipment, and scheduling resources in real-time through the cooperation set and the main transmission point, wherein the identity measurement module comprises:
a first location determination unit for determining a location of the user equipment;
a first negotiate configuration unit for negotiating with a virtual cell to configure a CSI-RS (Channel State Information Reference Signal) resource;
a first measurement configuration parameter transmission unit for transmitting the measurement configuration parameter to the user equipment; and
a first measurement unit for implementing a measurement for the CSI-RS resource,
after receiving the measurement configuration parameter;
a change identification module, used for when the user equipment moves to a new location,
transmitting, by a macro eNB (enhanced Node B), a modified measurement configuration parameter,
determining, by the macro eNB, a new cooperation set and a target transmission point of the new cooperation set based on the measurement report reported by the user equipment, and scheduling, by the macro eNB, resources in real-time through the new cooperation set and the target transmission point, wherein the change identification module comprises:
a second location determination unit for determining a new location of the user equipment:
a second negotiate configuration unit for negotiating with the virtual cell to configure the CSI-RS resource;
a second measurement configuration parameter transmission unit for modifying the measurement configuration parameter according to a reconfigured CSI-RS resource, and transmitting the modified measurement configuration parameter to the user equipment;
a second measurement unit for implementing a measurement for the reconfigured CSI-RS resource, after receiving the measurement configuration parameter;
a second cooperation set determination unit for determining the new cooperation set of the user equipment according to the CSI-RS RSRP (Reference Signal Received Power) in the measurement report, and determining the main transmission point in the cooperation set at the same time, after receiving the measurement report from the user equipment:

a second notification unit for notifying the virtual cell of the determined new cooperation set and the target transmission point;

a second feedback parameter transmission unit for transmitting the CSI feedback configuration parameter to the user equipment;

a second evaluation report unit for evaluating the CSI of the new cooperation set in real-time according to the CSI feedback configuration parameter, and reporting to the main transmission point; and a second resource scheduling unit for scheduling resources in real-time according to the CSI evaluation information reported by the user equipment, realizing a data interaction with the user equipment.

* * * * *